United States Patent
Huang et al.

(10) Patent No.: US 7,840,603 B2
(45) Date of Patent: Nov. 23, 2010

(54) METHOD AND APPARATUS FOR DATABASE CHANGE MANAGEMENT

(75) Inventors: Hsin-Liang Huang, San Jose, CA (US); Donald B. Langworthy, San Jose, CA (US); Jayashree Ramachandran, Sunnyvale, CA (US); Jeffrey Ralph Ruggles, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 1085 days.

(21) Appl. No.: 11/272,933

(22) Filed: Nov. 14, 2005

(65) Prior Publication Data

US 2007/0112886 A1 May 17, 2007

(51) Int. Cl.
*G06F 17/30* (2006.01)

(52) U.S. Cl. .............................. 707/802; 707/999.104; 707/E17.005

(58) Field of Classification Search .............. 707/609, 707/705, 791, 802, 999.104, 999.203, E17.005; 703/22
See application file for complete search history.

(56) References Cited

U.S. PATENT DOCUMENTS

| | | | |
|---|---|---|---|
| 5,613,111 A | 3/1997 | Malatesta et al. ............ 395/602 |
| 5,710,920 A | 1/1998 | Maruyama et al. ........... 395/614 |
| 5,794,030 A | 8/1998 | Morsi et al. .................. 395/614 |
| 5,950,190 A | 9/1999 | Yeager et al. ................... 707/3 |
| 6,405,205 B1 | 6/2002 | Hakuba ........................ 707/101 |
| 6,480,848 B1 | 11/2002 | DeKimpe et al. .............. 707/8 |
| 6,542,895 B1 | 4/2003 | DeKimpe et al. ........... 707/101 |
| 6,546,395 B1 | 4/2003 | DeKimpe et al. ........... 707/101 |
| 6,556,986 B2 | 4/2003 | Hara et al. ..................... 707/2 |
| 6,578,043 B2 | 6/2003 | Nye ............................ 707/102 |
| 6,615,220 B1* | 9/2003 | Austin et al. ............. 707/104.1 |
| 6,631,381 B1 | 10/2003 | Couch et al. ................ 707/102 |
| 6,694,325 B2 | 2/2004 | Jas .............................. 707/102 |
| 6,697,817 B2 | 2/2004 | Muraoka ..................... 707/102 |
| 6,701,514 B1 | 3/2004 | Haswell et al. ............. 717/115 |
| 6,721,735 B1* | 4/2004 | Lee ............................... 707/5 |
| 6,895,401 B2* | 5/2005 | Skinner et al. ................. 707/1 |
| 6,931,414 B1* | 8/2005 | Oh ............................. 707/102 |
| 6,999,977 B1* | 2/2006 | Norcott et al. .............. 707/203 |
| 7,487,080 B1* | 2/2009 | Tocci et al. ................... 703/22 |
| 2003/0226109 A1* | 12/2003 | Adamson et al. ............ 715/513 |
| 2004/0181542 A1* | 9/2004 | Mullins ...................... 707/102 |
| 2005/0114404 A1 | 5/2005 | Pintar et al. ................. 707/200 |
| 2005/0131964 A1 | 6/2005 | Saxena ....................... 707/203 |

OTHER PUBLICATIONS

Lin et al., Model Comparison: A Key Challenge for Transformation Testing and Version Control in Model Driven Software Development, 2004, OOPSLA Workshop, pp. 1-6.*

* cited by examiner

*Primary Examiner*—Fred I Ehichioya
(74) *Attorney, Agent, or Firm*—Yee & Associates, P.C.; Terry J. Carroll

(57) ABSTRACT

A computer implemented method, apparatus, and computer usable program code to compare a base model to a desired model to identify changes needed to form the desired model. The changes are placed in a data structure containing a set of elements, wherein the set of elements identify a set of structural database entities and a set of changes to the set of structural database entities. Changes are made to a target model using the data structure to form a resulting model.

24 Claims, 7 Drawing Sheets

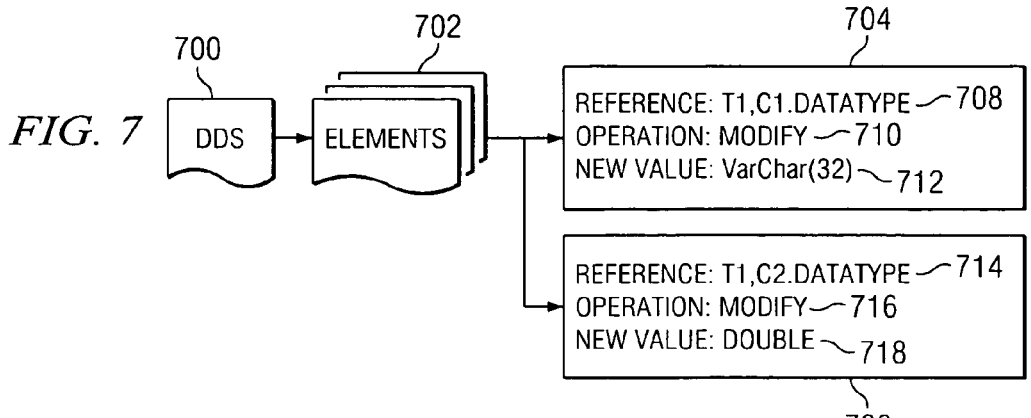
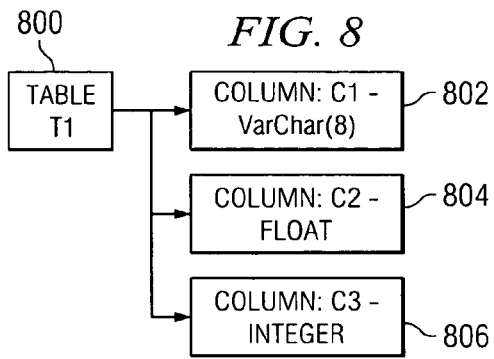
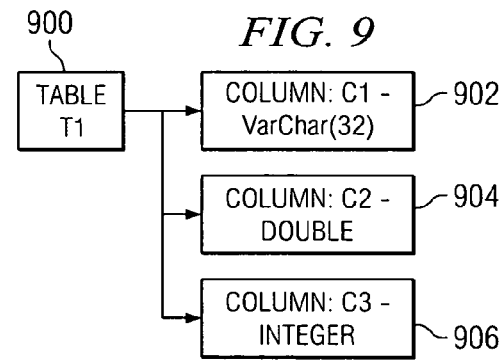
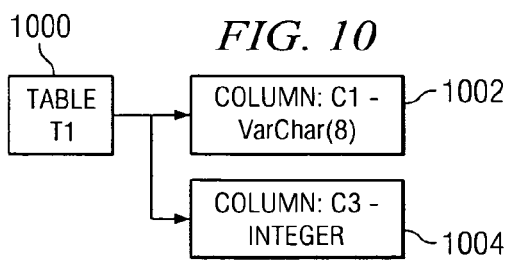
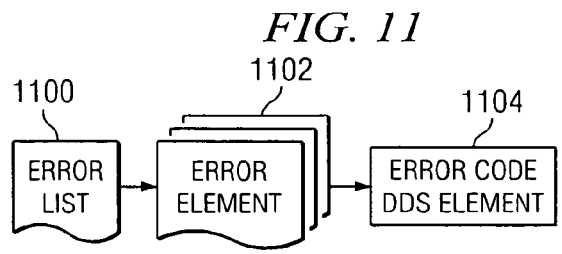

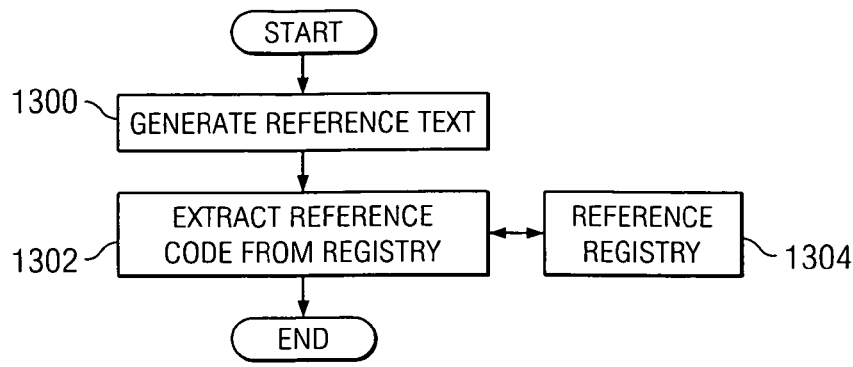
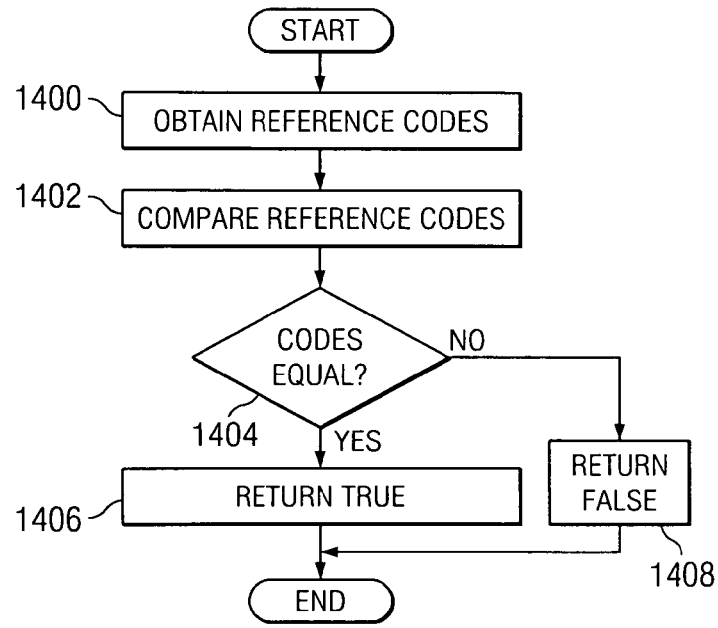

METHOD AND APPARATUS FOR DATABASE CHANGE MANAGEMENT

BACKGROUND OF THE INVENTION

1. Field of the Invention

The present invention relates generally to an improved data processing system and in particular to a computer implemented method and apparatus for managing data. Still more particularly, the present invention relates to a computer implemented method, apparatus, and computer usable program code for managing changes in databases.

2. Description of the Related Art

A database typically contains a relational database, which appears to a user as a set of user-defined tables. A table contains rows and columns. A column contains a name and data type, and a row is a record of data values entered for the columns. With this type of database, a catalog or dictionary is present to define these tables, as well as indexes and views of the tables. Additionally, relationships between the tables plus data entered by the users may be cataloged.

Typically, a database may be frequently subject to a series of changes resulting from upgrades, debugging, and expansions of the product. When these changes occur, the database has to be updated to reflect the changes.

One known system for propagating changes in a database is structured query language (SQL) data definition language (DDL). This system is provided natively by most relational databases and is used to change the database. With this type of system, a number of drawbacks are present. Data definition language implementations vary widely among different databases making the process very vendor specific. Further, constructing a data definition language manually is error prone and the statements in this type of system are limited.

Additionally, a number of steps may be required before the change can be made. As an example, in making a simple change to a table, the entire table may be dropped and recreated. Further, additional steps may be required after executing the data definition language. A change may result in other database entities being placed into an invalid or inoperative state requiring additional data definition language operations to resolve these cascading effects.

Other solutions that have been used employ using proprietary extensions on top of sequential query language systems. Change definition language (CDL) is an example of a solution using a proprietary extension. This type of language is used to represent structural changes in processes to change a database structure. These types of extended languages also have limitations. For example, the solution is context dependent on a specific database at a particular point in time. Therefore, it is not easily integrated throughout an entire enterprise with modification.

Further, this solution typically performs an error validation step and requires error resolution before the language can be processed to change the database. These steps are required because the database cannot represent invalid structures. These structures are less reusable between database vendors because vendor data definition language languages are not identical.

Also, some systems are used to aggregate changes as they are made. Unfortunately, many ways exist to change a database, making it increasingly likely that changes will be made without being aggregated using these types of tools. Another disadvantage of using the aggregation is the possibility of recording duplicate change records.

Using data definition language alone requires detailed knowledge of the capabilities of the data definition language and the limitations of the particular database. For example, all dependent objects must be dropped before a user defined type can be changed in some databases. Further, structured query language extended languages simplifies change in a column type. This type of system, however, does not represent every atomic change a database administrator might like to make. If such atomic changes could be represented, this type of system would be so complex that it would be impractical to use. Additionally, reducing the dependency on the particular database in the particular state means that less customization is present for the user.

Therefore, it would be advantageous to have an improved computer implemented method, apparatus, and computer usable program code for managing database changes.

SUMMARY OF THE INVENTION

The present invention provides a computer implemented method, apparatus, and computer usable program code to compare a base model to a desired model to identify changes needed to form the desired model. The changes are placed in a data structure containing a set of elements, wherein the set of elements identify a set of structural database entities and a set of changes to the set of structural database entities. Changes are made to a target model using the data structure to form a resulting model.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is an example of a delta definition structure used to change a base model to a desired model in accordance with an illustrative embodiment of the present invention;

FIG. 8 is a diagram of a target database model in accordance with an illustrative embodiment of the present invention;

FIG. 9 is a diagram illustrating a result database model in accordance with an illustrative embodiment of the present invention;

FIG. 10 is an example of an incompatible target database model in accordance with an illustrative embodiment of the present invention;

FIG. 11 is an error list structure in accordance with an illustrative embodiment of the present invention;

FIG. 13 is a flowchart of the process for identifying an element in accordance with an illustrative embodiment of the present invention;

FIG. 14 is a flowchart for comparing reference codes in accordance with an illustrative embodiment of the present invention;

FIG. 16 is a diagram illustrating code for applying a delta definition structure to a target model database in accordance with an illustrative embodiment of the present invention;

DETAILED DESCRIPTION OF THE PREFERRED EMBODIMENT

Figure 1:
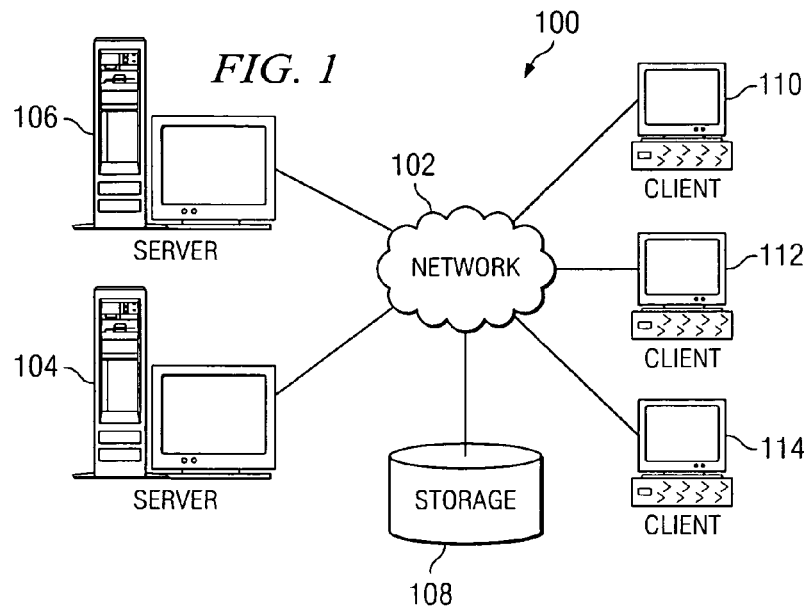
FIG. 1 is a pictorial representation of a network of data processing systems in accordance with an illustrative embodiment of the present invention.
Figure 2:
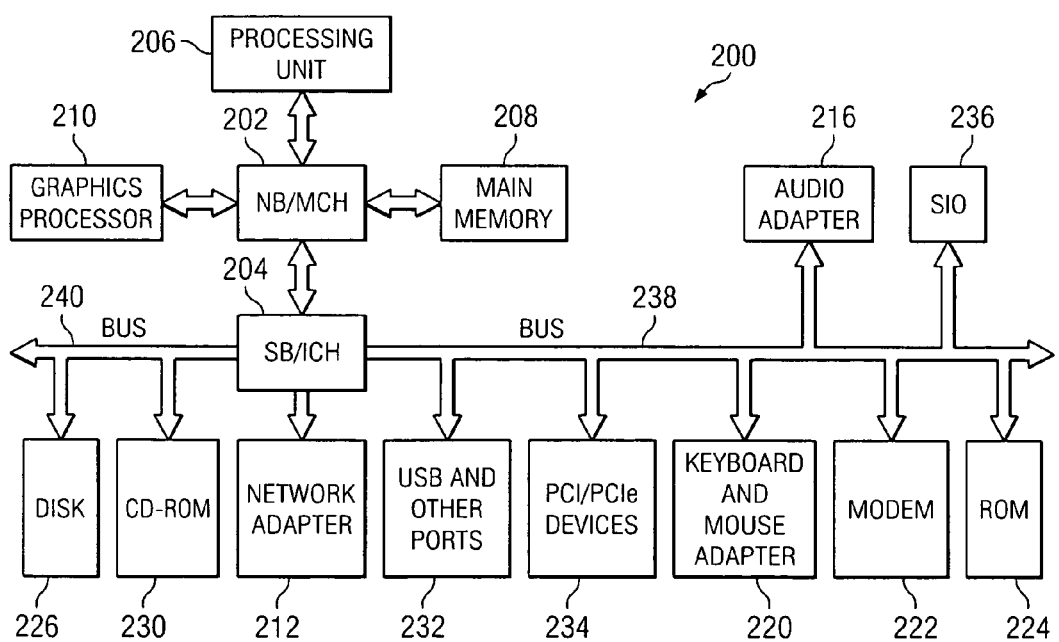
FIG. 2 is a block diagram of a data processing system in accordance with an illustrative embodiment of the present invention.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The aspects of the present invention provide a computer implemented method, apparatus, and computer usable program code for database change management. The aspects of the present invention use a delta definition structure that contains subject references and change actions. This particular data structure is used to perform database changes. This delta definition structure identifies and encodes structural database entities, attributes, and dependencies. Some aspects of the present invention therein apply the delta definition structure to change a database model of structural database entities, attributes, and dependencies. In particular, the delta definition structure is created by comparing a source database model and a target database model to each other. A list of entity mappings is created from the comparison. The entity mappings are mappings for structural database entities. Examples of structural database entities include tables, views, triggers, columns, data types, buffer pools, table spaces, and table space containers. The list of entity mappings is analyzed and change operations used to transform a target are derived from this comparison. A set of delta definition structure is constructed for each list entry and change operation required. The delta definition structure may contain one or more elements. The delta definition structure is applied to a database model in which each operation defined in the delta definition structure is applied to a structural database entity to make the changes.

Figure 3:
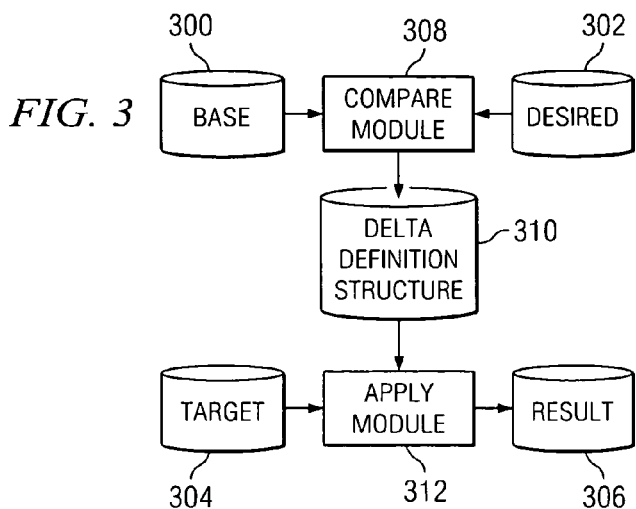
FIG. 3 is a diagram illustrating components used in database change management in accordance with an illustrative embodiment of the present invention.

Turning now to FIG. 3, a diagram illustrating components used in database change management is depicted in accordance with an illustrative embodiment of the present invention. In this example, base model 300 and desired model 302 are present. Base model 300 is a model used as a starting point for comparison, and desired model 302 is a model used as an ending point of a comparison. In these examples, base model 300 may be, for example, a database or a portion of a database. Target model 304 is a model that will have changes applied to it. Target model 304 also may be an entire database or a portion of a database depending on the particular implementation. Target model 304 is updated in place in these examples. Result model 306 is a model that is present after delta definition structures are applied to target model 304. Result model 306 and target model 304 are the same model at different points in time.

Compare module 308 is a software component or process that is used to analyze differences between desired model 302 and base model 300. This comparison is used to generate delta definition structure 310. Apply module 312 is a software component or process that is used to convert target model 304 into result model 306 by applying delta definition structure 310 to target model 304. In these examples, a model is data structure representing the structure of a database. This data structure contains data objects and the relationships between the data objects for a database. These data objects include, for example, tables, schemas, buffer pools, and table spaces. A model can be derived from various sources, such as, for example, a file in a file system, a database catalog, or a data definition language that creates a database. The model could be implemented in other ways, such as in a database through tables and relationships. The model may represent all objects in the database or a portion of database objects. For instance, a particular model may only represent the data objects used by the payroll application.

Compare module 308 and apply module 312 are illustrated as separate components or processes for purposes of describing the invention. Depending upon the particular implementation, these processes or modules may be combined into a single component or multiple components. Further, these different processes or modules may be implemented on the same data processing system in which the databases are being compared. For example, base model 300, desired model 302 may be both located on the same data processing system, such as server 104 in FIG. 1.

Alternatively, base model 300 and desired model 302 may be located on different data processing systems. For example, base model 300 may be located on server 104 while desired model 302 may be located on client 114 in FIG. 1. Additionally, the different process, such as compare module 308 and apply module 312 may be located on yet a different data processing system, such as client 110 in FIG. 1.

Figure 4:
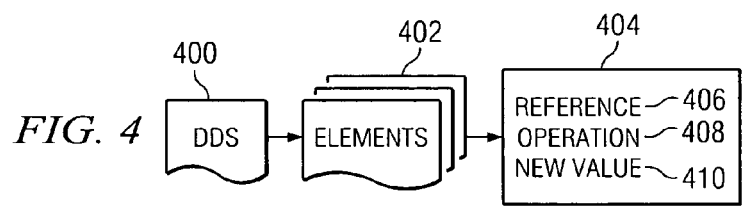
FIG. 4 is a diagram illustrating a delta definition structure in accordance with an illustrative embodiment of the present invention.

Turning now to FIG. 4, a diagram illustrating a delta definition structure (DDS) is depicted in accordance with an illustrative embodiment of the present invention. Delta definition structure 400 is an example of delta definition structure 310 in FIG. 3. In this example, delta definition structure 400 contains elements 402, which are an ordered collection of elements. Elements 402 are placed or stored in a selected order for processing. In other words, when elements 402 are applied to a target model, elements within elements 402 are selected in the order defined for processing. The order in which elements are applied to databases may affect whether the changes occur correctly. Examples of other situations in which the application of elements in a particular order is important include adding a table and its associated columns. Greater efficiency is present to add a table before adding a column. The same importance for order applies to added tables before added views that depend on those tables or adding buffer pools and table spaces before adding tables that use those buffer pools and table spaces. The particular type of data structure used to hold these elements may be any type of data structure that maintains the ordering of the contents.

Element 404 is an example of an element found in elements 402. Element 404 contains reference 406, which is a reference or pointer to a structural database entity. This reference is used to locate a structural database entity within a database model. A database model in these examples is part of or an entire database. Additionally, element 404 also contains operation 408, which identifies an operation to be performed on the structural database entity referred to in reference 406. This operation may take various forms. For example, the operation may be to create a structural database entity, to drop a structural database entity, or to leave a structural database entity in a model. The operation also may be to modify or change an existing structural database entity within the model. Element 404 also may contain new value 410 for the structural database entity identified by reference 406.

In these illustrative examples, delta definition structure 400 contains one element for each modified structural database entity and one element in elements 402 for each created, dropped, or modified structural database entity.

Figure 5:
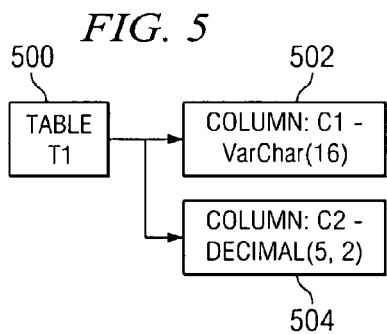
FIG. 5 is an example of a base database model in accordance with an illustrative embodiment of the present invention.

Turning now to FIG. 5, an example of a base database model is depicted in accordance with an illustrative embodiment of the present invention. In this example, the base database model includes table T1 500. Table T1 500 contains column C1 502 and column C2 504. These columns are structural database entities within table T1 500 in these illustrative examples. Column C1 502 has a variable character length of sixteen and column C2 504 has a decimal length of five with a precision of two.

Figure 6:
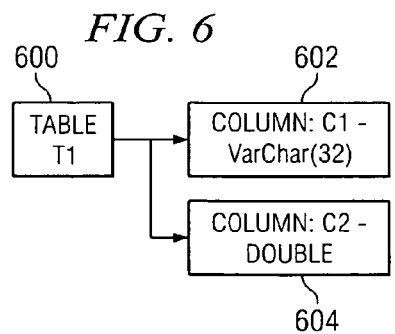
FIG. 6 is a diagram illustrating a desired database model in accordance with an illustrative embodiment of the present invention.

Next in FIG. 6, a diagram illustrating a desired database model is shown in accordance with an illustrative embodiment of the present invention. In this example, the desired database model contains table T1 600. This table contains column C1 602 and column C2 604. These two columns are structural database entities. Column C1 602 is a variable character having a length of thirty two. Column C2 604 is a value having a double precision floating point number.

The base database model and the desired database model each have only two structural database entities for purposes of illustrating the different processes of the present invention. In actual use, the delta definition structure and the processes for the different aspects of the present invention may be applied to other numbers of structural database entities. These structural database entities may be part of a database or an entire database, depending on the particular application.

Turning next to FIG. 7, an example of a delta definition structure used to change a base model to a desired model in accordance with an illustrative embodiment of the present invention. Delta definition structure 700 contains elements 702. In this example, elements 702 includes element 704 and element 706. Element 704 contains reference 708, operation 710, and new value 712. Similarly, the element in 706 contains reference 714, operation 716, and new value 718.

In this example, delta definition structure 700 is applied to change the structural database entities, such as those illustrated in FIG. 5. In these examples, column C1 502 and column C2 504 in FIG. 5 are the two structural database entities that are changed to the desired model as shown in FIG. 6.

Elements 702 in delta definition structure 700 are applied to the structural database entity table T1 500 in FIG. 5. In this example, element 704 and element 706 in elements 702 are applied to the structural database entity illustrated in FIG. 5 to generate the structural database entity illustrated in FIG. 6. Delta definition structure 700 contains the changes needed to form desired database model. Elements 702 describe the operations that are performed on the structural database entity in the base database model in FIG. 5 to form the desired database model for the structural database entity in FIG. 6.

Element 704 contains reference 708. This reference points to column C1 502 in the entity table T1 500 in FIG. 5. Operation 710 indicates that this data type should be modified. Other operations that may be performed include, for example, creating a new entity or dropping an entity. In this example, element 704 is a modify element. An element creating a new entity is referred to as a new element, and an element dropping or removing an entity is referred to as a drop element in these examples. New value 712 defines the new value for the modifications. New value 712 indicates that the particular attribute for the structural database entities should be changed to a variable character having a length of 32.

As depicted, reference 714 in element 706 points to column C2 504 in the entity table T1 500 in FIG. 5. In this example, operation 716 indicates that a modification should be made to this structural database entity. New value 718 indicates that the modification is to change the data type in column C2 604 in FIG. 6 to double.

Turning now to FIG. 8, a diagram of a target database model is depicted in accordance with an illustrative embodiment of the present invention. In this example, the target database model is table T1 800 which contains structural database entities column C1 802, column C2 804, and column C3 806. A target database model containing table T1 800 is shown before a delta definition structure has been applied to this model. In this particular case, an application of delta definition structure 700 to table T1 800 is performed.

Each element in delta definition structure 700 in FIG. 7 contains a modification operation. The references in each of the elements refer to structural database entities in a target database model in this example. These structural database entities are column C1 802, column C2 804, and column C3 806. In this example, column C3 806 is not referred to by any element in delta definition structure 700 in FIG. 7.

As can be seen, column C1 802 contains variable character with a length of 8, column C2 804 is a float, and column C3 806 is an integer. As can be seen, the existing values to the attributes in table T1 800 are not the same as the values in table T1 500 in FIG. 5. For example, table T1 800 includes a column that does not exist on either the base database model in FIG. 5 or the desired database model in FIG. 6. When delta definition structure 700 in FIG. 7 is applied to table T1 800, each element in delta definition structure 700 is processed and is applied to table T1 800 in the target database model without errors.

Turning now to FIG. 9, the diagram illustrating a result database model is depicted in accordance with an illustrative embodiment of the present invention. In this example, the result database model contains table T1 900, with structural database entities column C1 902, column C2 904, and column C3 906.

In this illustrative example, the structural database entity, column C1 902, has been changed from a variable character having a length of 8 to a variable character having a length of 32 based on the modify operation using the element from the delta definition structure. Column C2 904 is a structural entity that has been changed from a float to a double using an element from a delta definition structure. Column C3 906 has not been changed in these examples after the application of the delta definition structure.

Turning now to FIG. 10, an example of an incompatible target database model is depicted in accordance with an illustrative embodiment of the present invention. In this example, the target model contains table T1 1000 with structural database elements column C1 1002 and C3 1004. When delta definition structure 700 in FIG. 7 is applied to table T1 1000 in the target database model, reference 714 in element 706 refers or points to a structural database entity that does not exist in table T1 1000. As a result, element 706 is not applied to the target database model in FIG. 10. With this situation, an error report is generated. The user may be given an opportunity to adjust the target database model by copying structural database entity 504 in FIG. 5 into the target database model and then applying element 706.

Turning now to FIG. 11, an error list structure is depicted in accordance with an illustrative embodiment of the present invention. In this example, error list 1100 is generated when application of a delta definition structure results in errors. Error list 1100 contains error elements, such as error elements 1102. Error elements 1102 contains error code delta definition structure element 1104. Error element 1104 is an example of an error element within error elements 1102. Error element 1104 contains delta definition structure element 1106, which may be delta definition structure element 404 in FIG. 4. Error element 1104 also contains error code 1108. Error code 1108 is used to identify the type of error that has occurred and takes the form of an integer in these examples. Delta definition structure element 1106 is the delta definition structure element that caused the error and is contained by copy or reference in error element 1104. The entity referred to by the reference in delta definition structure element 1106 refers to the particular structural database entity that has the error. In some cases, the error is caused by the absence of this entity.

The generation of errors for error list 1100 may occur in various situations. These situations include, for example, a delta definition structure element with a drop or modify operation that refers to a structural database entity that is not found in the target database model. Another example of an error is a delta definition structure element that contains a create operation that refers to a structural database entity that is already found in the target database model.

In these examples, error list 1100 is returned with the resulting model from the application of the delta definition structure. Error list 1100 contains a list of delta data structure elements that were not properly applied and allows for a selection of each delta definition structure element or group of elements. Based on this presentation of error list 1100, the user may ignore the element. The user also may copy or replace the reference structural database entity from the base database model. Additionally, the user may merge the reference structural database entity from the base database model with the reference structural database entity from the target database model. Alternatively, the user may mark the data definition structure element as an error for later correction.

When the user has made the appropriate selections, the process of the present invention reapplies the delta definition structure elements for a copy, merge, or leave the marked delta definition structure elements for later processing.

Figure 12:
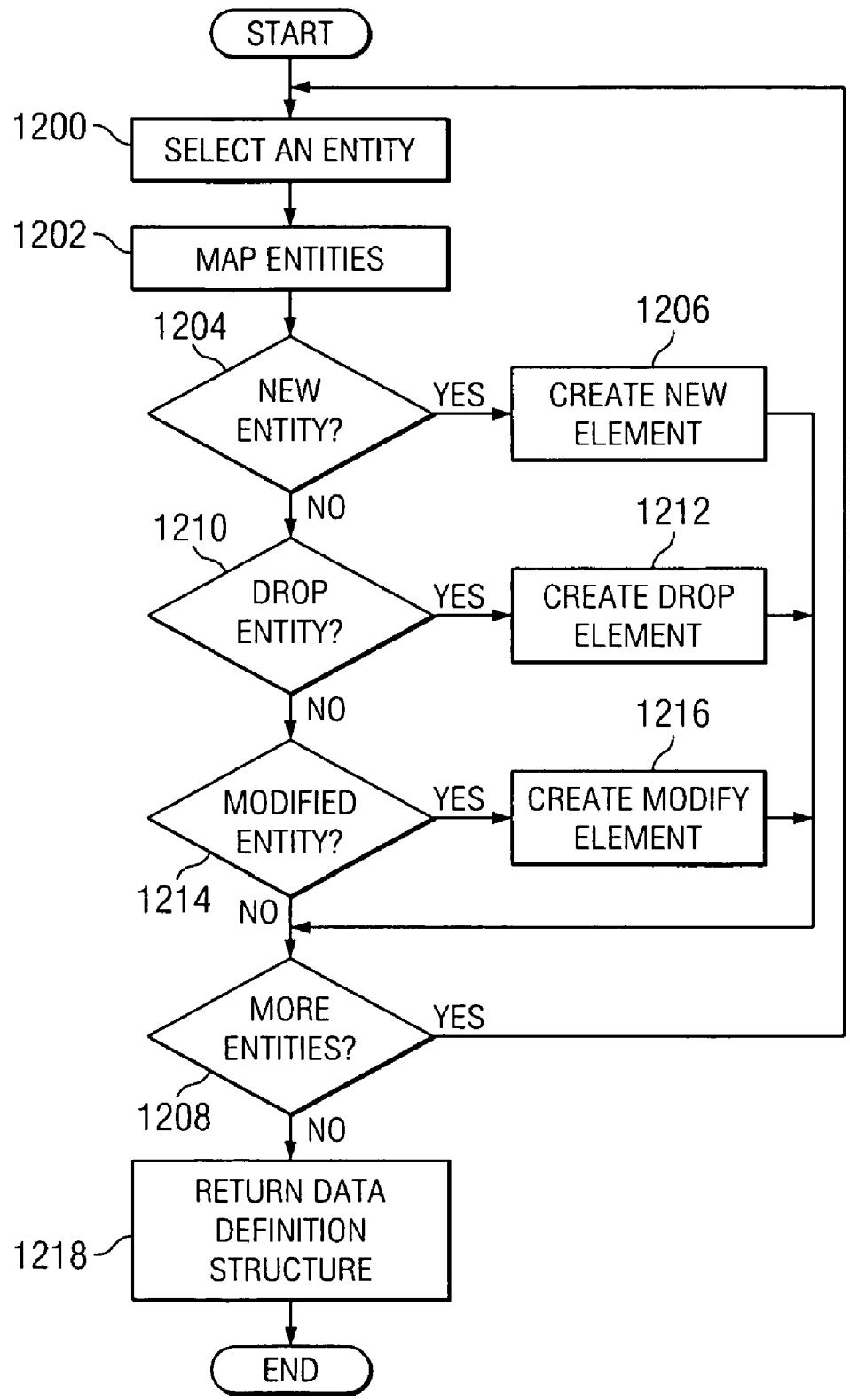
FIG. 12 is a flowchart of a process for creating a delta definition structure in accordance with an illustrative embodiment of the present invention.

Turning now to FIG. 12, a flowchart of process for creating a delta definition structure is depicted in accordance with an illustrative embodiment of the present invention. The process illustrated in FIG. 12 may be implemented in a process, such as compare module 308 in FIG. 3.

The process begins by selecting an entity (step 1200). In step 1200, structural database entities are selected from both models. A structural database entity is, for example, a table or view within a database model. In these examples, the entities are selected from a base model and a desired model, such as base model 300 and desired model 302 in FIG. 3. These entities are structural database entities in these examples. The process then maps the selected entities (step 1202). The identification mapping of entities are described in more detail in FIGS. 13 and 14 below, which describe database element identification and mapping.

After the process has mapped the entities in step 1202, a determination is made as to whether a new entity is needed (step 1204). In this example, an element is located within a delta definition structure. Each element in these examples contains a reference to a structural database entity, an operation to be performed on that entity, and a new value that may be used for the entity.

Determining what change is needed may be accomplished in a number of different ways. For example, if during mapping step 1202, it is discovered that a particular database structural entity is present in the base database model and is not present in the desired database model, a new delta definition structure element is needed. If, during mapping in step 1202, it is discovered that a particular database structural entity is not present in the base database model and is present in the desired database model, a drop delta definition structure element is needed to drop the entity from the model. If, during step 1202, it is discovered that a particular database entity exists in both the base database model and the desired database model and one or more attributes on that particular structural database entity from the base database model differ from the same attribute on that particular structural database entity on the desired database model one or more modify delta definition structure elements are created.

If a new entity is needed, then a new element is created (step 1206). The process then proceeds to determine whether more entities are present for mapping (step 1208). If additional entities are present for mapping, the process returns to step 1200 to select another entity.

With reference again to step 1204, if the mapping of the entities does not result in a new entity, a determination is made as to whether the entity is to be dropped as a result of the mapping (step 1210). If the entity is to be dropped, the process creates a drop element (step 1212) with the process then proceeding to step 1208 as described above.

In step 1210, if the result of the mapping is not a dropped element, a determination is made as to whether the mapping of the entities results in a modified entity (step 1214). An example of a modified element results when creating a delta definition structure to describe the changes from table T1 500 in FIG. 5 to table T1 600 in FIG. 6. In this example column C1 502 has a different length from column C1 602 (16 vs. 32) and column C2 504 has a different datatype from column C2 604 (decimal (5,2) vs. double). If the mapping results in a modified entity, the process then creates a modify element (step 1216), and then proceeds to step 1208 as described above. Otherwise, the process proceeds directly to step 1208.

In step 1208, if more entities are not present for mapping, a data definition structure is returned to step 1218 with the process terminating thereafter. In this manner, a data definition structure with a collection of elements is created for use in making changes to a module. If there are additional entities at step 1208, the process then returns to step 1200.

Turning now to FIG. 13, a flowchart of the process for identifying an element is depicted in accordance with an illustrative embodiment of the present invention. The process illustrated in FIG. 13 is a more detailed described of the process occurring in step 1202 in FIG. 12.

The process begins by generating a reference text (step 1300). A reference is a pointer or identifier that is used to locate an object, such as a structural database entity. In step 1300, a text string is generated for a reference to a particular structural database entity. This string is constructed in a manner to be unique from any other structural database entity. Further, the reference text generated in step 1300 is defined to be consistent for a given structural database entity in any model. One manner in which the reference text may be generated in step 1300 is to use a concatenation of the structural database entity type name, the entity name, and any unique strings that may be generated by the containing hierarchy of structural database entities.

Thereafter, the process extracts a reference code from the registry (step 1302) with the process terminating thereafter. Techniques for obtaining reference code to an arbitrary data structure include well known techniques involving hashes, message digests, or counting mechanisms based on binary search tables. This arbitrary data structure may include, for example, strings or arrays of characters. The specific technique employed to extract the reference code may differ depending on the particular implementation. In these examples, a hash function, such as one provided by the String class in Java, is used to generate a unique code for the string in a reference. This string is obtained in step 1300 in these examples. Reference registry 1304 is a hash table in these examples.

In step 1302, the reference string is placed in reference registry 1304, and a code is retrieved from registry 1304. This registry is constructed to prevent storing of duplicate strings and to return the same code for any given text string value. Reference registry 1304 is a data structure used to facilitate efficient retrieval of references and structural database entities to which the references refer. The references in structural database entities are stored in specific data structures.

Other implementations may use other mechanisms to generate the reference text for step 1300 and other types of data structures to implement reference registry 1304.

In these examples, the reference text generated in step 1300 is consistent for both the specified structural database entity in question and is unique among all possible structural database entities.

An example of a reference string for a table, such as table T1 502 in FIG. 5, is as follows:

<pkey id="S1.T1" type="org.eclipse.wst.rdb.internal.models.sql.tables.Table" />

Another example of a reference string is one for column C1 502 in FIG. 5, which is as follows:

<pkey id="S1.T1.C1" type="org.eclipse.wst.rdb.internal.models.sql.tables.Column" ><pkey type="org.eclipse.wst.rdb.internal.models.sql.tables.Table" /></pkey>

Turning now to FIG. 14, a flowchart for comparing reference codes is depicted in accordance with an illustrative embodiment of the present invention. The process illustrated in FIG. 14 also provides a more detailed description of step 1202 in FIG. 12. In FIG. 14, this process is used to determine if a correct mapping of entities occurs through the comparison of the references to the structural database entities in the two different database models. These references may be, for example, a reference in a base model compared to a reference in a desired model for use in generating elements in a delta definition structure. Additionally, this mapping may be used between the reference in an element in a delta definition structure and a target model to generate the result model.

The process begins by obtaining reference codes (step 1400). In step 1400, the reference codes are obtained through the entities in the different models that are to be compared. When locating a specific structural database entity given a reference and a reference code stored within the reference, the process starts with a database. With the example of column C1 502 in FIG. 5, the schema S1 is searched and within schema S1, a search is made for the table T1. Thereafter, when column T1 is located, a search is made for column C1. Within a delta definition element, such as delta definition element 404 in FIG. 4, a copy or a pointer to the reference is stored within this element. In this case, the look-up for a structural database entity is unnecessary.

Next, the reference codes are compared (step 1402). This comparison is used to determine if a correct mapping of entities is present based on the references identified. A determination is made as to whether the codes are equal (step 1404). If the codes are equal, a true result is returned (step 1406) with the process terminating thereafter. Otherwise, a false result is returned (step 1408) with the process terminating thereafter. When using references to structural database entities to map such entities from two different database models, the comparison of equality of codes in this process is necessary and a sufficient condition to determine quick mapping of these entities between the database models.

The true and false results are used in FIG. 12 to create elements for a delta definition structure. A failure of codes to map in these examples means that a structural database entity should be created or dropped when an element for delta definition structure is created.

Figure 15:
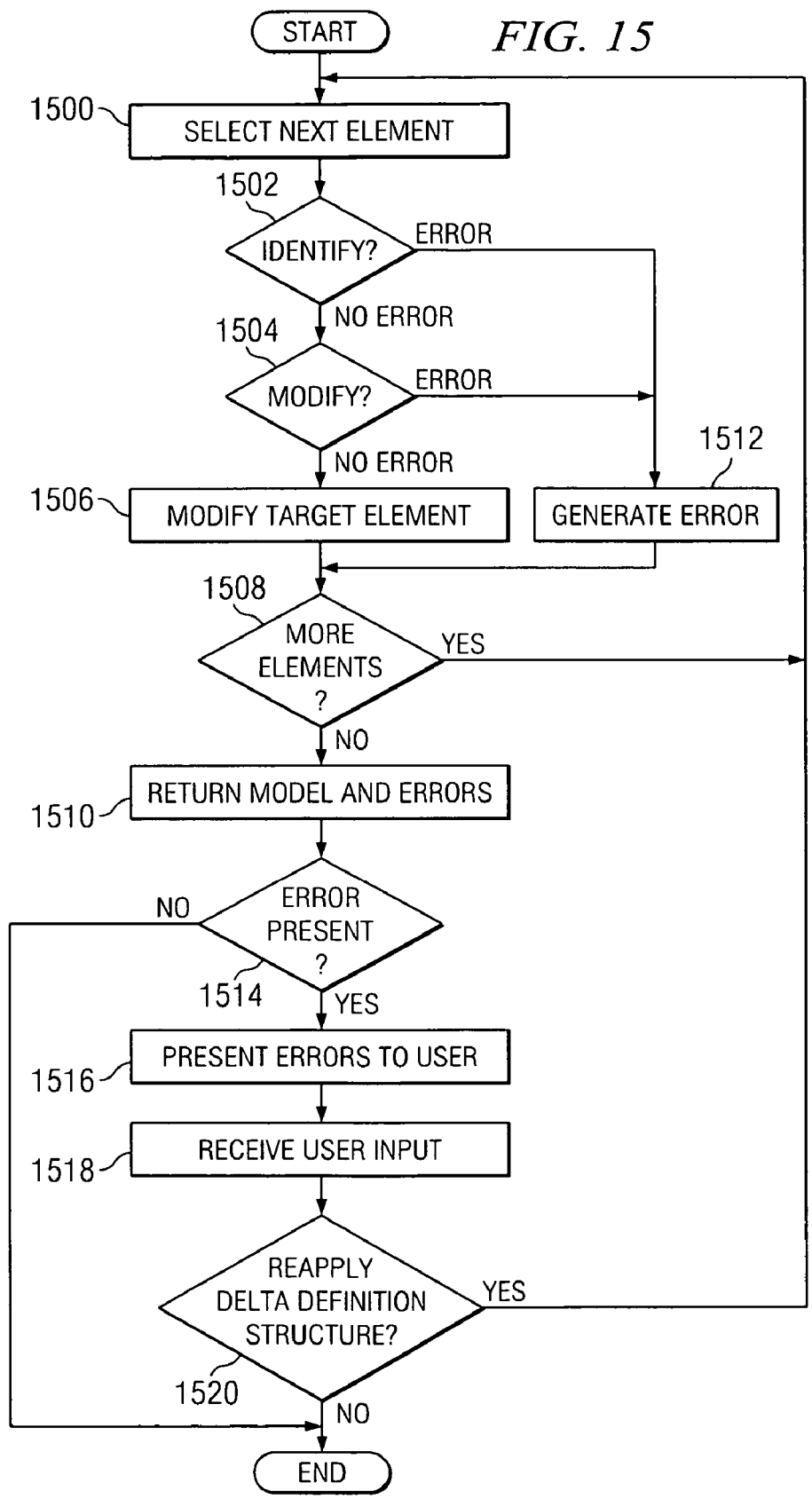
FIG. 15 is a flowchart of a process for applying a delta definition structure in accordance with an illustrative embodiment of the present invention.

Turning next to FIG. 15, a flowchart of a process for applying a delta definition structure is depicted in accordance with an illustrative embodiment of the present invention. The process illustrated in FIG. 15 may be implemented in a process such as that found in apply module 312 in FIG. 3. The process applies a delta definition structure as an input to a model. This model may be, for example, target 304 in FIG. 3.

The process begins by selecting the next element in the delta definition structure for processing (step 1500). The elements are used to identify structural database entities and make changes to these entities. Each of the elements contains a reference to a structural database entity. Additionally, each element also contains an operation to be performed on that entity. These operations may include, for example, modifying the entity, dropping the entity, or adding a new entity.

Thereafter, a determination is made as to whether a structural database entity can be identified without an error in the model using the reference in the element (step 1502). In step 1502, references to the structural database entity stored in the selected delta definition structural elements are used to determine whether the structure identified in the delta definition structure element can be found in the model that is to be modified or changed. This modification includes dropping or adding a structural database entity in these examples. When applying a delta definition structure to a model, step 1502 uses the process in FIG. 14 to determine whether the reference in the element matches a structural database entity in the model. These results are used to determine if errors are present. For example, if a structural database entity is to be created the codes should not map to each other and a false should be returned. An error is generated if a mapping is present because the structure is already present and cannot be created again. If a structural database entity should be present and is to be modified or deleted, an error is generated if the codes do not map.

If the entity can be identified without an error, a determination is made as to whether the structural database entity can be modified as specified by the operation in the element (step 1504). In step 1504, the process determines whether the change operation specified in the delta definition structure element can be used to modify the structural database entities in the model without an error.

If the target structural database entity can be modified without an error, the process modifies the target structural database entity as specified by the operation in the element (step 1506). Each delta definition structure element is associated with one or more change operations for an element within the model being modified.

Thereafter, a determination is made as to whether additional elements are present for processing (step 1508). If additional elements are present, the process returns to step 1500 to select the next element for processing. With reference again to step 1502 and step 1504, if the reference identified by the delta definition structure element cannot be identified in the model or the reference cannot be modified without an error, the process generates an error (step 1512). In step 1512, the errors detected during the application of delta definition structure elements to the model are stored. These elements include, but are not limited to missing structural database entities and duplicated structural database entities.

The process then proceeds to step 1508 as described above. With reference again to step 1508, if additional elements are not present, the process returns the model and any errors that may have been generated (step 1510). A determination is made as to whether any errors are present (step 1514). If errors are present, these errors are presented to the user (step 1516). Thereafter, user input is received (step 1518). The user input may be to correct the errors, copy appropriate structures into the target model, or mark the errors for later processing.

Thereafter, a determination is made as to whether the delta definition structure should be reapplied to the target model (step 1520). If the delta definition structure should be reapplied, the process returns to step 1500. Otherwise, the process terminates. The process also terminates in step 1514 if no errors are present when the model is returned. In these examples, the elements from the delta definition structure are processed in sequence as they are found in this structure.

Turning now to FIG. 16, a diagram illustrating code for applying a delta definition structure to a target model database is depicted in accordance with an illustrative embodiment of the present invention. Code 1600 illustrates an example of the steps used to apply a delta definition structure to a target model. In code 1600 for each delta definition structure element, the reference to a structural database entity is located using line 1602.

For example, if the reference is to a specific database entity, such as a column in a table, the reference is first used to locate the schema in which the column is located and then locate the column itself. In this example, the target is a model of the database for which the delta definition structure is being applied. The mapping of references from the delta definition structure to the model and the controlling of these operations occurs using rules as specified on line 1604 and line 1606.

Figure 17:
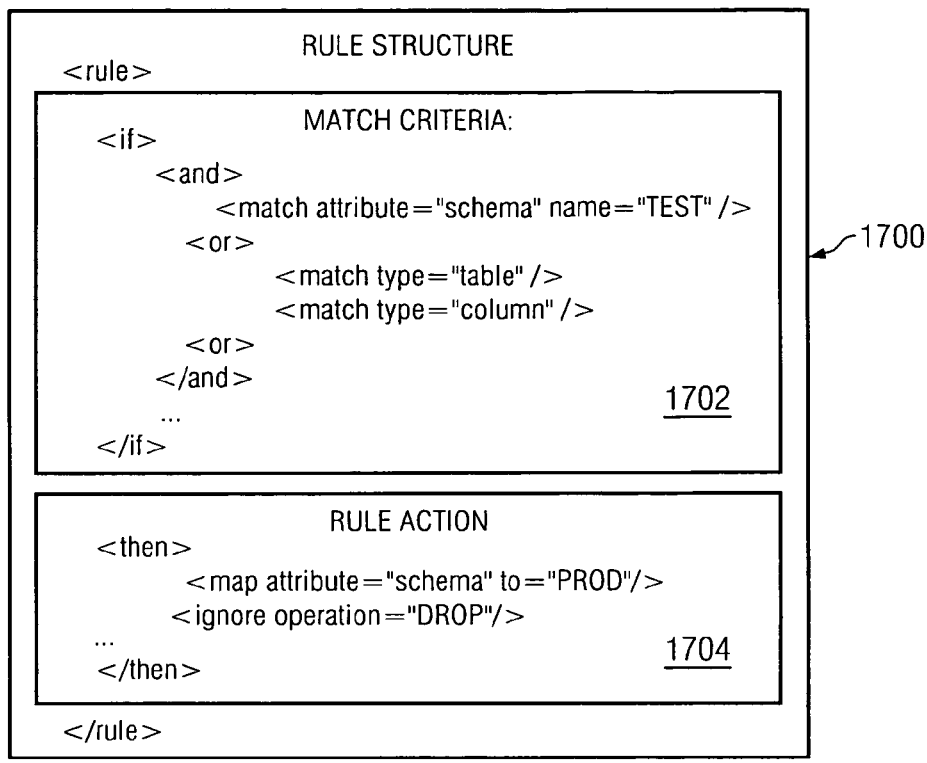
FIG. 17 is an example of a rule structure in accordance with an illustrative embodiment of the present invention.

Turning now to FIG. 17, an example of a rule structure is depicted in accordance with an illustrative embodiment of the present invention. Rule structure 1700 is used by code 1600 in FIG. 16 in applying elements in a delta definition structure to structural database entities. In this example, rule structure 1700 contains match criteria 1702 and rule action 1704.

Match criteria 1702 is optional in these examples. If match criteria 1702 is not present, then the match or comparison is considered to be successful.

Rule structure 1700 takes the form of an extensible markup language (XML) structure in these depicted examples. Match criteria 1702 may be combined using logical operations, such as "and" or "or". In this example, match criteria 1702 is applied to a table or column object in the test schema.

Figure 18:
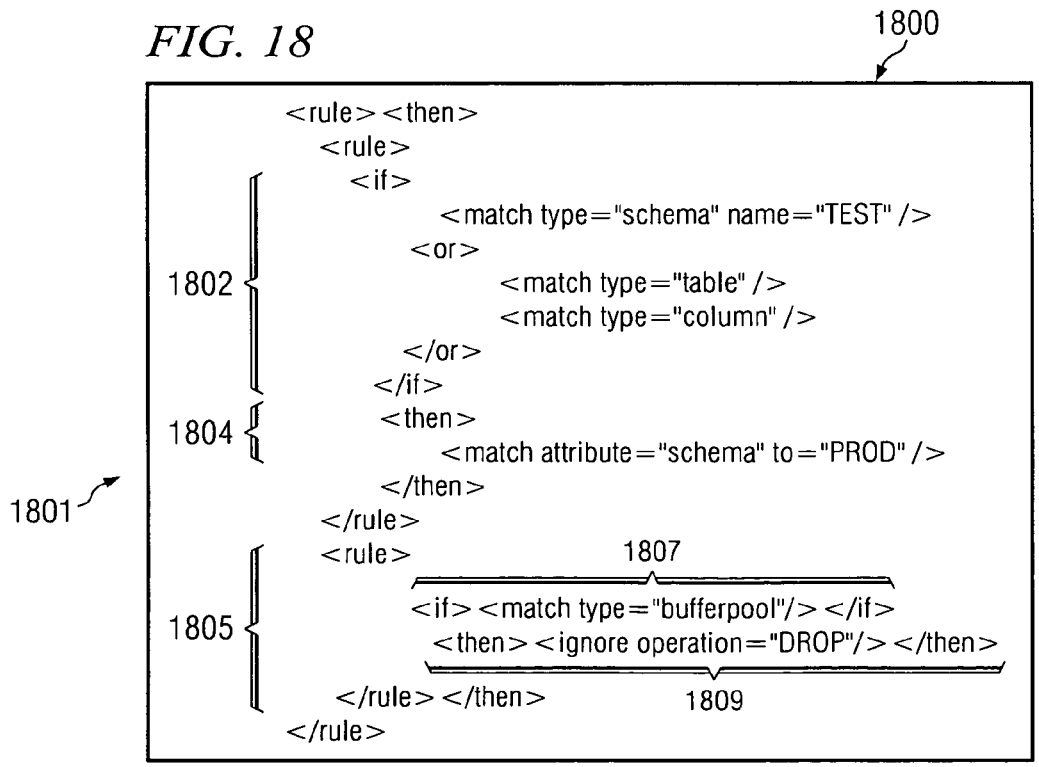
FIG. 18 is a specific example of a rule in accordance with an illustrative embodiment of the present invention.

Turning now to FIG. 18, a specific example of a rule is depicted in accordance with an illustrative embodiment of the present invention. Rule 1800 contains match criteria in section 1802 and rule actions in section 1804. In this example, columns in tables in the test schema are remapped to a PROD schema. Additionally, rule 1800 influences operations specified by the delta definition structure. Rule 1801 and rule 1805 are found within rule 1800. Rule 1801 contains match criteria 1802 and rule actions 1804. Rule 1805 contains match criteria 1807 and rule actions 1809. Action 1804 in rule 1801 maps the schema TEST to schema PROD for all tables and columns. Action 1809 in rule 1805 causes the drop operation to be performed on all buffer pools to be ignored.

Thus, the aspects of the present invention provide a computer implemented method, apparatus, and computer usable program code for making changes to database systems. The aspects of the present invention compares models to determine changes between those models and then uses those identified changes to create a delta definition structure. The delta definition structure contains elements in which each element is mapped to database structural entities. Additionally, the elements in the delta definition structure identify operations needed to change a base model to a desired model for a database. This delta definition structure is then applied to the target database to create the desired database.

With the aspects of the present invention, changes may be applied to a model even when the target model is different from the base model using this particular mechanism. Additionally, changes may be stored to a file and errors or exceptions to incompatibilities may be captured for analysis and further action. With the aspects of the present invention, one user at work with a subset of structural database entities may transmit these changes to another user working with a larger subset of structural database entities or the entire database.

Further, the aspects of the present invention as described above improve support for different vendors of databases because the delta definition structure is not tied to a specific vendor or source of a data definition language. Also, the dependence on a particular database being a particular state is reduced, resulting in less customization needed for the change. Additionally, as described above, rules also may be defined to customize the process to alter changes.

This rule set is used to customize the process. As an example, operations specified by the delta definition structure elements may be altered or ignored depending on the particular rule being applied.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be a storage medium such as an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for making changes to a database, the computer implemented method comprising steps performed by a computer of:
   the computer comparing a base model to a desired model to identify changes needed to form the desired model;
   the computer placing the changes in a data structure containing a set of elements, wherein the set of elements identify a set of structural database entities and a set of changes to the set of structural database entities; and
   the computer making changes to a target model using the data structure and a rule to form a resulting model, wherein the target model is at least a portion of the database, and wherein the rule alters certain change operations specified by the data structure.

2. The computer implemented method of claim 1, wherein a change in the set of changes is selected from one of, modify a structural database entity, create the structural database entity, or drop the structural database entity, wherein the base model is a representation of at least a portion of a preexisting database and the desired model is a representation of at least another portion of the preexisting database.

3. The computer implemented method of claim 1, wherein the set of elements are in an order for processing and wherein the making step comprises:
   selecting an unprocessed element from the set of elements using the order for processing;
   locating a structural database entity identified by the unprocessed element in the target model to form a located structural database entity; and
   applying a change to the located structural database entity.

4. The computer implemented method of claim 3, wherein the applying step comprises:
   determining whether the rule applies to the located structural database entity; and
   applying the identified change to the located structural database entity subject to the rule if the rule applies.

5. The computer implemented method of claim 1, wherein the making step comprises:
   selecting an unprocessed element from the set of elements;
   determining whether an identified change in the unprocessed element can be applied to an identified structural database entity; and
   generating an error if the identified change cannot be applied to the identified structural database entity.

6. The computer implemented method of claim 5 further comprising:
   presenting errors generated in forming the resulting model; and
   providing options to correct the errors generated in forming the resulting model.

7. The computer implemented method of claim 1, wherein the comparing step comprises:
   mapping a base structural database entity in the base model to a desired structural database entity in the desired model; and
   identifying a change needed to form the desired structural database entity in the desired model.

8. The computer implemented method of claim 1, wherein the data structure is a delta definition structure, and wherein each element of the set of elements includes (i) a reference to a structural database entity within a database model, (ii) an operation identifier which identifies an operation to be performed on the structural database entity defined by the reference, and (iii) a new value to be applied to the structural database entity defined by the reference.

9. A computer program product comprising:
   a computer readable storage medium having computer usable program code encoded therein for making changes to a database, the computer program product comprising:
   computer usable program code for comparing a base model to a desired model to identify changes needed to form the desired model;
   computer usable program code for placing the changes in a data structure containing a set of elements, wherein the set of elements identify a set of structural database entities and a set of changes to the set of structural database entities; and
   computer usable program code for making changes to a target model using the data structure and a rule to form a resulting model, wherein the target model is at least a portion of the database, and wherein the rule alters certain change operations specified by the data structure.

10. The computer program product of claim 9, wherein a change in the set of changes is selected from one of, modify a structural database entity, create the structural database entity, or drop the structural database entity, wherein the base model is a representation of at least a portion of a preexisting database and the desired model is a representation of at least another portion of the preexisting database.

11. The computer program product of claim 9, wherein the set of elements are in an order for processing, and wherein the computer usable program code for making changes to a target model using the data structure to form a resulting model comprises:
   computer usable program code for selecting an unprocessed element from the set of elements using the order for processing;
   computer usable program code for locating a structural database entity identified by the unprocessed element in the target model to form a located structural database entity; and
   computer usable program code for applying a change to the located structural database entity.

12. The computer program product of claim 11, wherein the computer usable program code for applying a change to the located structural database entity comprises:
   computer usable program code for determining whether the rule applies to the located structural database entity; and
   computer usable program code for applying the identified change to the located structural database entity subject to the rule if the rule applies.

13. The computer program product of claim 9, wherein the computer usable program code for making changes to a target model using the data structure to form a resulting model comprises:
  computer usable program code for selecting an unprocessed element from the set of elements;
  computer usable program code for determining whether an identified change in the unprocessed element can be applied to an identified structural database entity; and
  computer usable program code for generating an error if the identified change cannot be applied to the identified structural database entity.

14. The computer program product of claim 13 further comprising:
  computer usable program code for presenting errors generated in forming the resulting model; and
  computer usable program code for providing options to correct the errors generated in forming the resulting model.

15. The computer program product of claim 9, wherein the computer usable program code for comparing a base model to a desired model to identify changes needed to form the desired model comprises:
  computer usable program code for mapping a base structural database entity in the base model to a desired structural database entity in the desired model; and
  computer usable program code for identifying a change needed to form the desired structural database entity in the desired model.

16. The computer program product of claim 9, wherein the data structure is a delta definition structure, and wherein each element of the set of elements includes (i) a reference to a structural database entity within a database model, (ii) an operation identifier which identifies an operation to be performed on the structural database entity defined by the reference, and (iii) a new value to be applied to the structural database entity defined by the reference.

17. A data processing system comprising:
  a bus;
  a communications unit connected to the bus;
  a storage device connected to the bus, wherein the storage device includes computer usable program code; and
  a processor unit connected to the bus, wherein the processor unit executes the computer usable program code to compare a base model to a desired model to identify changes needed to form the desired model; place the changes in a data structure containing a set of elements, wherein the set of elements identify a set of structural database entities and a set of changes to the set of structural database entities; and make changes to a target model using the data structure and a rule to form a resulting model, wherein the target model is at least a portion of the database, and wherein the rule alters certain change operations specified by the data structure.

18. The data processing system of claim 17, wherein a change in the set of changes is selected from one of, modify a structural database entity, create the structural database entity, or drop the structural database entity, wherein the base model is a representation of at least a portion of a preexisting database and the desired model is a representation of at least another portion of the preexisting database.

19. The data processing system of claim 17, wherein the elements are in an order for processing and wherein in executing the computer usable program code to make changes to a target model using the data structure to form a resulting model, the processor unit further executes the computer usable program code to select an unprocessed element from the set of elements using the order for processing; locate a structural database entity identified by the unprocessed element in the target model to form a located structural database entity; and apply a change to the located structural database entity.

20. The data processing system of claim 19, wherein in executing the computer usable program code to make changes to the located structural database entity, the processor unit further executes the computer usable program code to determine whether the rule applies to the located structural database entity; and apply the identified change to the located structural database entity subject to the rule if the rule applies.

21. The data processing system of claim 17, wherein in executing the computer usable program code to make changes to a target model using the data structure to form a resulting model, the processor unit further executes the computer usable program code to select an unprocessed element from the set of elements; determine whether an identified change in the unprocessed element can be applied to an identified structural database entity; and generate an error if the identified change cannot be applied to the identified structural database entity.

22. The data processing system of claim 21, wherein the processor unit further executes the computer usable program code to present errors generated in forming the resulting model; and provide options to correct the errors generated in forming the resulting model.

23. The data processing system of claim 17, wherein the processor unit further executes the computer usable program code to map a base structural database entity in the base model to a desired structural database entity in the desired model; and identify a change needed to form the desired structural database entity in the desired model.

24. The data processing system of claim 17, wherein the data structure is a delta definition structure, and wherein each element of the set of elements includes (i) a reference to a structural database entity within a database model, (ii) an operation identifier which identifies an operation to be performed on the structural database entity defined by the reference, and (iii) a new value to be applied to the structural database entity defined by the reference.

* * * * *